(12) United States Patent
Nakagaito et al.

(10) Patent No.: US 9,243,670 B2
(45) Date of Patent: Jan. 26, 2016

(54) DAMPER DEVICE

(71) Applicant: AISIN SEIKI KABUSHIKI KAISHA, Kariya-shi (JP)

(72) Inventors: Satoshi Nakagaito, Kariya (JP); Tomohiro Saeki, Anjo (JP); Masaru Ebata, Chita (JP); Tsutomu Sekine, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 12 days.

(21) Appl. No.: 14/261,046

(22) Filed: Apr. 24, 2014

(65) Prior Publication Data

US 2014/0323232 A1   Oct. 30, 2014

(30) Foreign Application Priority Data

Apr. 25, 2013   (JP) ................................. 2013-092979

(51) Int. Cl.
*F16F 15/121*     (2006.01)
*F16D 3/12*       (2006.01)
*F16F 15/139*     (2006.01)

(52) U.S. Cl.
CPC .............. *F16D 3/12* (2013.01); *F16F 15/1395* (2013.01)

(58) Field of Classification Search
CPC ............................. F16D 3/12; F16F 15/1395
USPC ..................... 464/46, 68.1; 192/212
See application file for complete search history.

(56) References Cited

U.S. PATENT DOCUMENTS 5,975,261 A * 11/1999 Woerner et al. ........... 192/212 X
2012/0234642 A1   9/2012 Sekine et al.

FOREIGN PATENT DOCUMENTS

DE   102006028777 A1   12/2007
JP   2012-042060 A      3/2012
JP   2012-193773 A     10/2012

OTHER PUBLICATIONS

Extended European Search Report dated Sep. 24, 2014, issued by the European Patent Office in corresponding European Patent Application No. 14165817.9 (6pgs).

* cited by examiner

*Primary Examiner* — Gregory Binda
(74) *Attorney, Agent, or Firm* — Buchanan Ingersoll & Rooney PC

(57) ABSTRACT

A damper device includes: a pair of first plates axially separated from each other along a rotation axis and rotatable integrally with each other around the axis in a state where the first plates intersect the axis; a second plate including a portion positioned between the first plates, having an opening, and rotatable around the axis in a state where the second plate intersects the axis; an elastic member between the first and second plates, and elastically deformed a circumferential direction of the axis; and a third plate having a first portion positioned on an inner side of the opening and coupled to the first plates in a state where the first portion is between the first plates, and a second portion positioned on an outer side of the opening, and rotatable around the axis in a state where the third plate intersects the axis.

9 Claims, 8 Drawing Sheets

DAMPER DEVICE

CROSS REFERENCE TO RELATED APPLICATIONS

This application is based on and claims priority under 35 U.S.C. §119 to Japanese Patent Application 2013-092979, filed on Apr. 25, 2013, the entire contents of which are incorporated herein by reference.

TECHNICAL FIELD

An embodiment of this disclosure relates to a damper device.

BACKGROUND DISCUSSION

In the related art, a damper device has been known which includes a pair of first plates rotating around a rotation axis, a second plate including a portion positioned between the pair of first plates, and an elastic member which is provided between the first plate and the second plate and is elastically deformed in a circumferential direction of the rotation axis. In the damper device, a spacer member which functions as a stopper for limiting a range of relative rotations around the rotation axis of the first plates and the second plate is provided between the pair of first plates (for example, refer to JP 2012-193773 (Reference 1)).

SUMMARY

In the above-described damper device in the related art, there are cases where an axial size becomes large in a portion having the stopper. Therefore, reducing the axial size of the damper device is desired.

A damper device according to an embodiment of this disclosure, as an example, includes a pair of first plates that are provided at positions separated from each other in an axial direction of a rotation axis and that are configured to be rotatable integrally with each other around the rotation axis in a state where the pair of first plates intersect the rotation axis; a second plate that includes a portion positioned between the pair of first plates, that has an opening, and that is configured to be rotatable around the rotation axis in a state where the second plate intersects the rotation axis; an elastic member that is provided between the first plate and the second plate, and that is elastically deformed at least in a circumferential direction of the rotation axis; and a third plate that has a first portion which is positioned on an inner side of the opening of the second plate and which is coupled to the pair of first plates in a state where the first portion is interposed between the pair of first plates from both sides in the axial direction, and a second portion which is positioned on an outer side of the opening of the second plate, and that is configured to be rotatable around the rotation axis in a state where the third plate intersects the rotation axis. The first portion and an inner side end surface of the opening are configured to be capable of coming into contact with each other, and when the first portion and the inner side end surface of the opening come into contact with each other, the first plate and the third plate, and the second plate are configured so that a range of relative rotations around the rotation axis is limited. In this manner, as an example, it is possible to reduce an axial size of the damper device.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment will be described with reference to the drawings.

First, referring to FIGS. 1 to 10, an example of a configuration of a damper device 100 according to the embodiment will be described. The damper device 100 is arranged between an engine (power device: not illustrated) and a transmission (speed change gear: not illustrated), and has a function for lessening (reducing) variations (torque difference) in a driving force.

Figure 1:
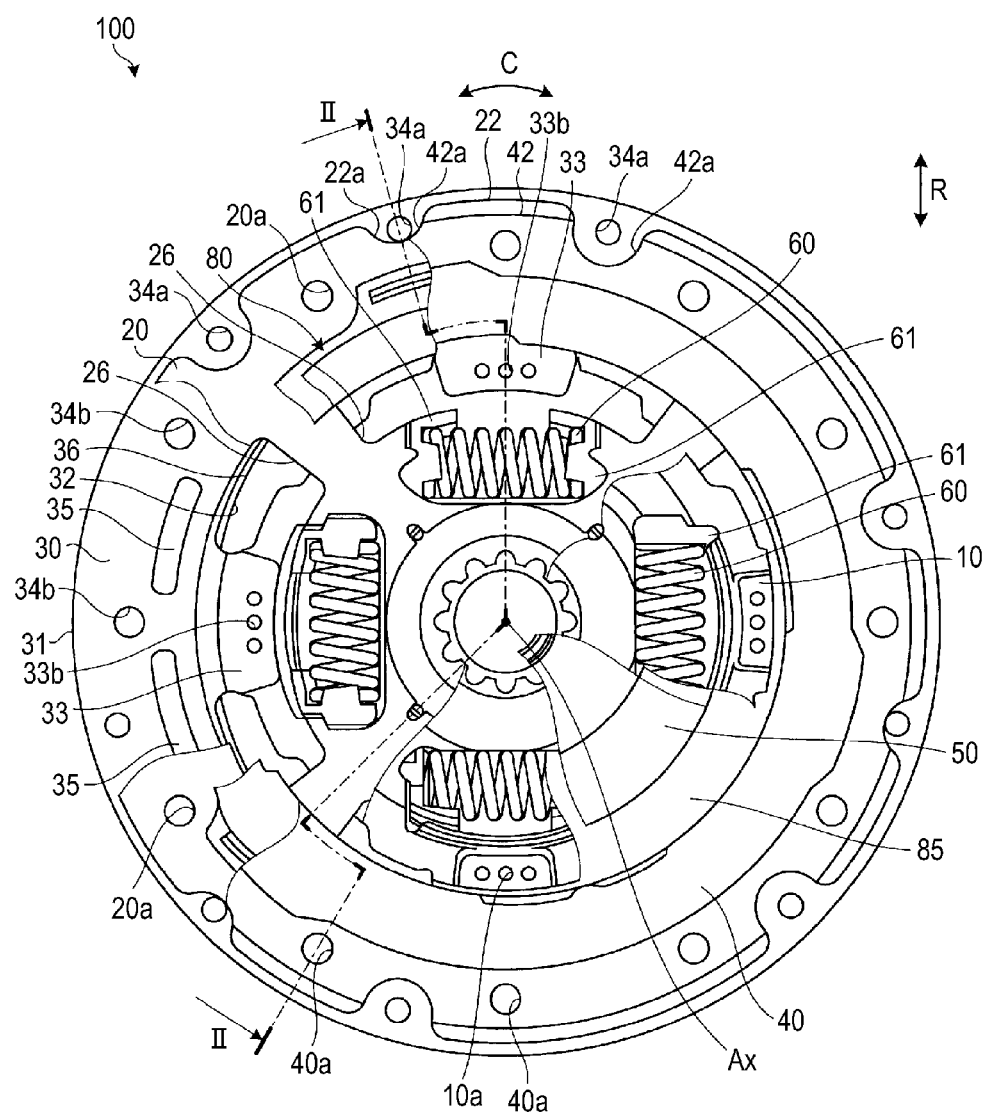
FIG. 1 illustrates an example of an overall configuration of a damper device according to an embodiment.
Figure 2:
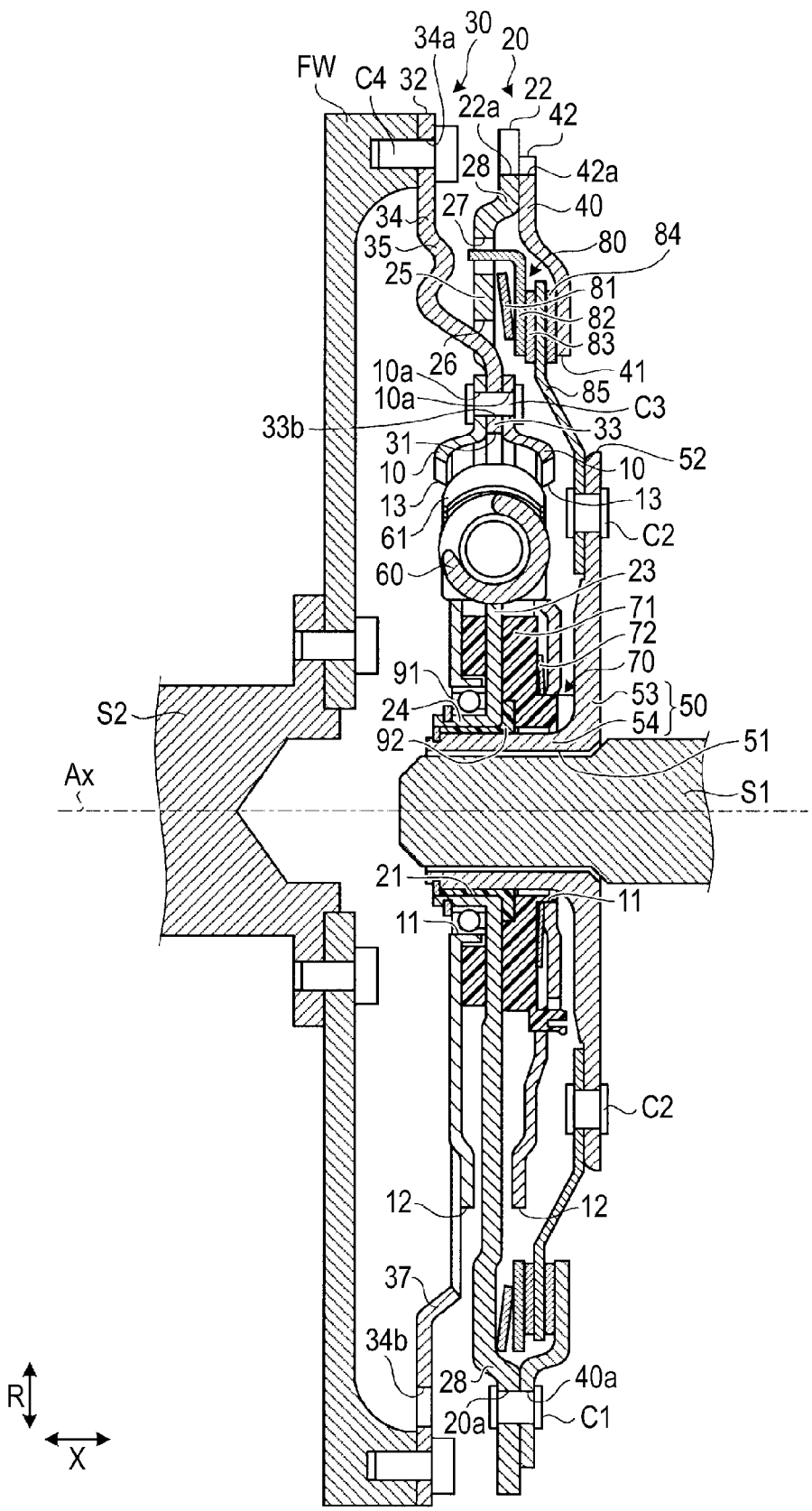
FIG. 2 is a cross-sectional view taken along line II-II in FIG. 1.

As illustrated in FIGS. 1 and 2, the damper device 100 includes multiple plate-shaped members (first plate 10, second plate 20, third plate 30, fourth plate 40 and fifth plate 50: to be described later) which are configured to be rotatable (pivotally movable) around a rotation axis Ax in a state where the plate-shaped members intersect the rotation axis Ax. The multiple plate-shaped members are configured to have a metal or the like. Hereinafter, in the following description, an extending direction of the rotation axis Ax (X-direction) is referred to as an axial direction, a direction orthogonal to the rotation axis Ax (R-direction) is referred to as a radial direction, and a rotating direction around the rotation axis Ax (C-direction) is referred to as a circumferential direction. In FIG. 1, fasteners C1 to C4 (to be described later) are omitted in the illustration. In addition, FIG. 1 is a view (cutaway view) when viewed from one side (right side in FIG. 2) in the axial direction of the damper device 100 illustrated in FIG. 2.

As illustrated in FIGS. 1 and 2, the damper device 100 includes an elastic member 60 which absorbs (temporarily stores) a torque difference by being deformed (stretched) in the circumferential direction. The elastic member 60 is configured to have a coil spring or the like. In addition, as illustrated in FIG. 1, the elastic member 60 is supported by a pair of support members 61 formed of a resin or the like from both sides in the circumferential direction. In addition, as illustrated in FIG. 2, the elastic member 60 and the support members 61 are provided between the first plate 10 and the second plate 20 (between a pair of first plates 10, and on an inner side of an opening 26 (to be described later) of the second plate 20).

In addition, as illustrated in FIG. 2, the damper device 100 includes a hysteresis mechanism 70 which reduces vibrations and noises by generating a hysteresis torque resulting from friction. The hysteresis mechanism 70 is configured to include a friction material 71 provided between the first plate 10 and the second plate 20, a disc spring 72 biasing (pressing by using an elastic force) the friction material 71 against the second plate 20 side, and the like.

In addition, as illustrated in FIGS. 1 and 2, the damper device 100 includes a torque limiter 80 which absorbs a torque difference by causing slippage to occur when the torque difference having a predetermined value or more. The torque limiter 80 is provided in the second plate 20. In addition, the torque limiter 80 is provided on a further outer side in the radial direction than the elastic member 60 so as to be overlapped with the elastic member 60 when viewed from the radial direction. Specifically, the elastic member 60 and the torque limiter 80 are respectively provided on an inner side and an outer side in the radial direction with respect to a first portion 33 (to be described later) of the third plate 30.

As illustrated in FIG. 2, the torque limiter 80 includes a disc spring 81, a plate-shaped member 82, two friction materials 83 and 84, and a connecting plate 85. The disc spring 81, the plate-shaped member 82, the friction materials 83 and 84 and the connecting plate 85 are arranged so as to be interposed between the second plate 20 and the fourth plate 40 which are coupled (fastened) to each other by the fastener C1 (in FIG. 2, as one example, a rivet is illustrated). The second plate 20 and the fourth plate 40 respectively have through-holes 20a and 40a into which the fastener C1 is inserted. Here, the second plate 20 has an annular shape including an inner peripheral portion 21 and an outer peripheral portion 22 when viewed from the axial direction. Similarly, the fourth plate 40 has an annular shape including an inner peripheral portion 41 and an outer peripheral portion 42 when viewed from the axial direction.

The disc spring 81 of the torque limiter 80 is configured to bias the plate-shaped member 82 against the friction material 83 side. In addition, the connecting plate 85 of the torque limiter 80 is arranged to be interposed between two friction materials 83 and 84. An inner side portion in the radial direction of the connecting plate 85 is coupled to a first portion 53 (to be described later) of the fifth plate 50 by the fastener C2 (in FIG. 2, as an example, a rivet is illustrated).

As illustrated in FIGS. 1 and 2, the fifth plate 50 has an annular shape including an inner peripheral portion 51 (refer to FIG. 2) and an outer peripheral portion 52 (refer to FIG. 2) when viewed from the axial direction. In addition, as illustrated in FIG. 2, the fifth plate 50 includes the first portion 53 extending in the radial direction and a second portion 54 (portion configuring the inner peripheral portion 51) extending to the other side (left side in FIG. 2) in the axial direction from the inner side end portion in the radial direction of the first portion 53. A shaft S1 provided on an input side of a transmission (not illustrated) is inserted into the inner side of the second portion 54. Specifically, engagement structures such as splines are respectively provided on an inner peripheral surface of the second portion 54 and an outer peripheral surface of the shaft S1. The second portion 54 and the shaft S1 are fixed to each other via these engagement structures.

Here, in the embodiment disclosed here, as illustrated in FIG. 2, the first plates 10 are provided on both sides in the axial direction of the elastic member 60 to become a pair. The first plates 10 are respectively provided at positions separated from each other in the axial direction. In addition, the first plates 10 respectively have an annular shape including an inner peripheral portion 11 and an outer peripheral portion 12 when viewed from the axial direction. In addition, openings 13 are respectively formed in a portion corresponding to the elastic member 60 of the pair of first plates 10.

Figure 3:
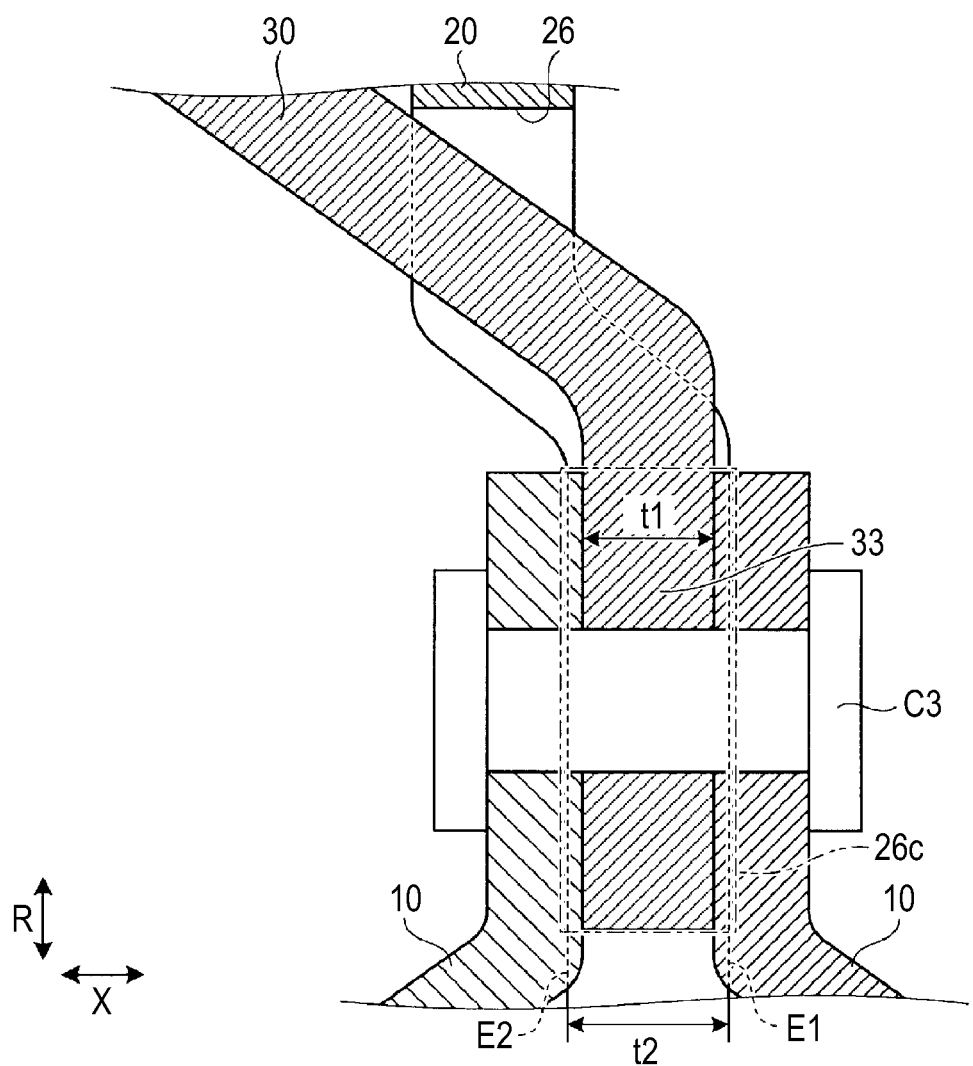
FIG. 3 is an enlarged view illustrating a first portion (stopper) of a third plate illustrated in FIG. 2 and an inner side opposing region of an opening of a second plate.
Figure 4:
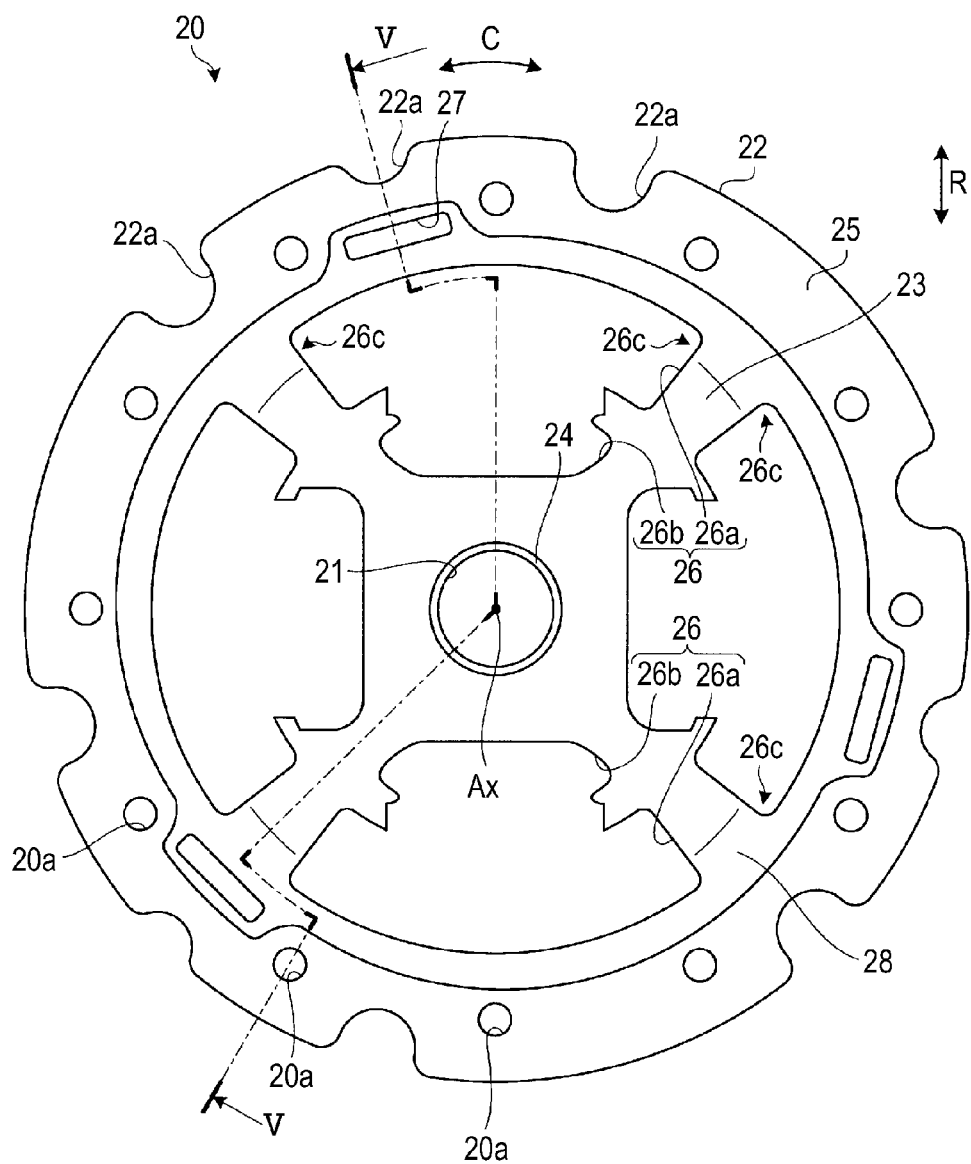
FIG. 4 illustrates an example of an overall configuration of the second plate of the damper device according to the embodiment.

In addition, as illustrated in FIGS. 2 to 5, the second plate 20 includes a first portion 23 extending in the radial direction between the pair of first plates 10, a second portion (portion having the inner peripheral portion 21) 24 extending to the other side (left side in FIG. 2) in the axial direction from the inner side end portion in the radial direction of the first portion 23, and a third portion (portion having the outer peripheral portion 22) 25 protruding outward in the radial direction from the pair of first plates 10. FIG. 4 is a view when the second plate 20 illustrated in FIG. 2 is viewed from the other side in the axial direction.

Figure 5:
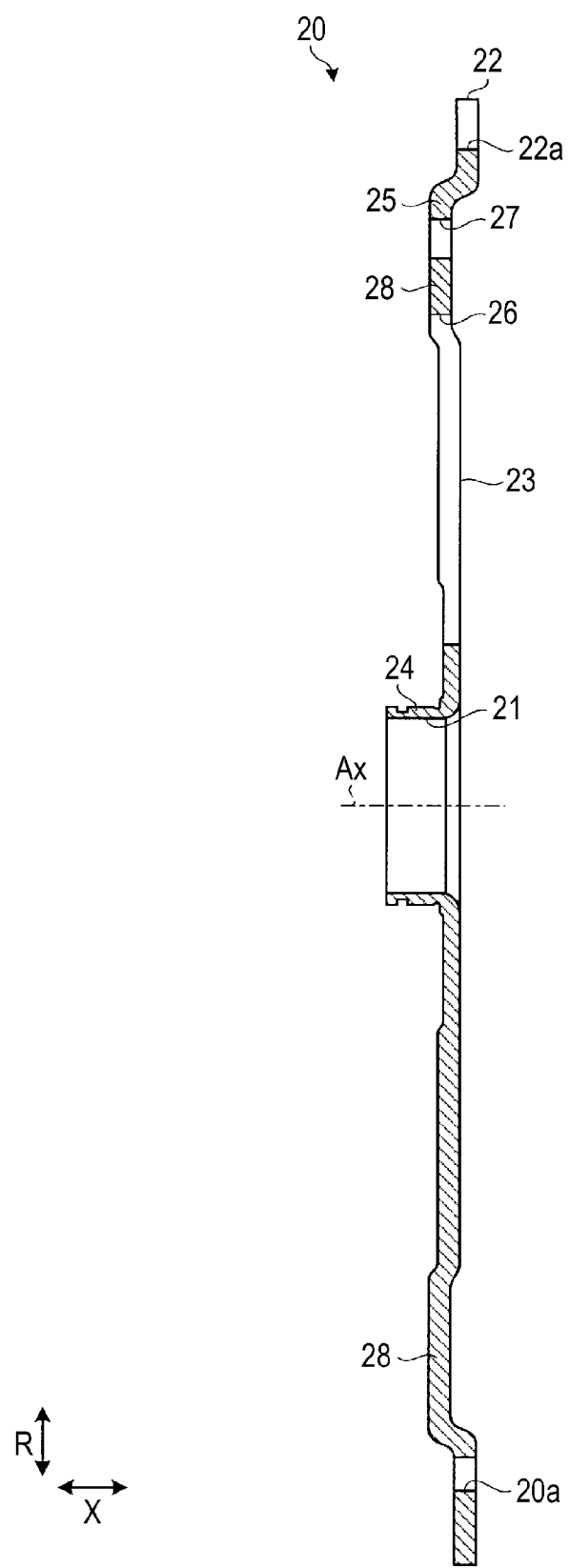
FIG. 5 is a cross-sectional view taken along line V-V in FIG. 3.

As illustrated in FIGS. 4 and 5, an opening 26 is provided in an intermediate portion in the radial direction of the second plate 20. The opening 26 is formed to straddle the first portion 23 and the third portion 25 of the second plate 20. In addition, the opening 26 has a first opening 26a which the first portion 33 (refer to FIGS. 2 and 3: to be described later) of the third plate 30 enters, and a second opening 26b which the elastic member 60 and the support member 61 (refer to FIG. 2) enter. In addition, an opening 27 which the plate-shaped member 82 of the torque limiter 80 enters is provided in a portion of the further outer peripheral portion 22 than the opening 26 of the second plate 20. As illustrated in FIG. 4, four of the opening 26 are provided at intervals in the circumferential direction, and three of the opening 27 are provided at intervals in the circumferential direction.

Figure 6:
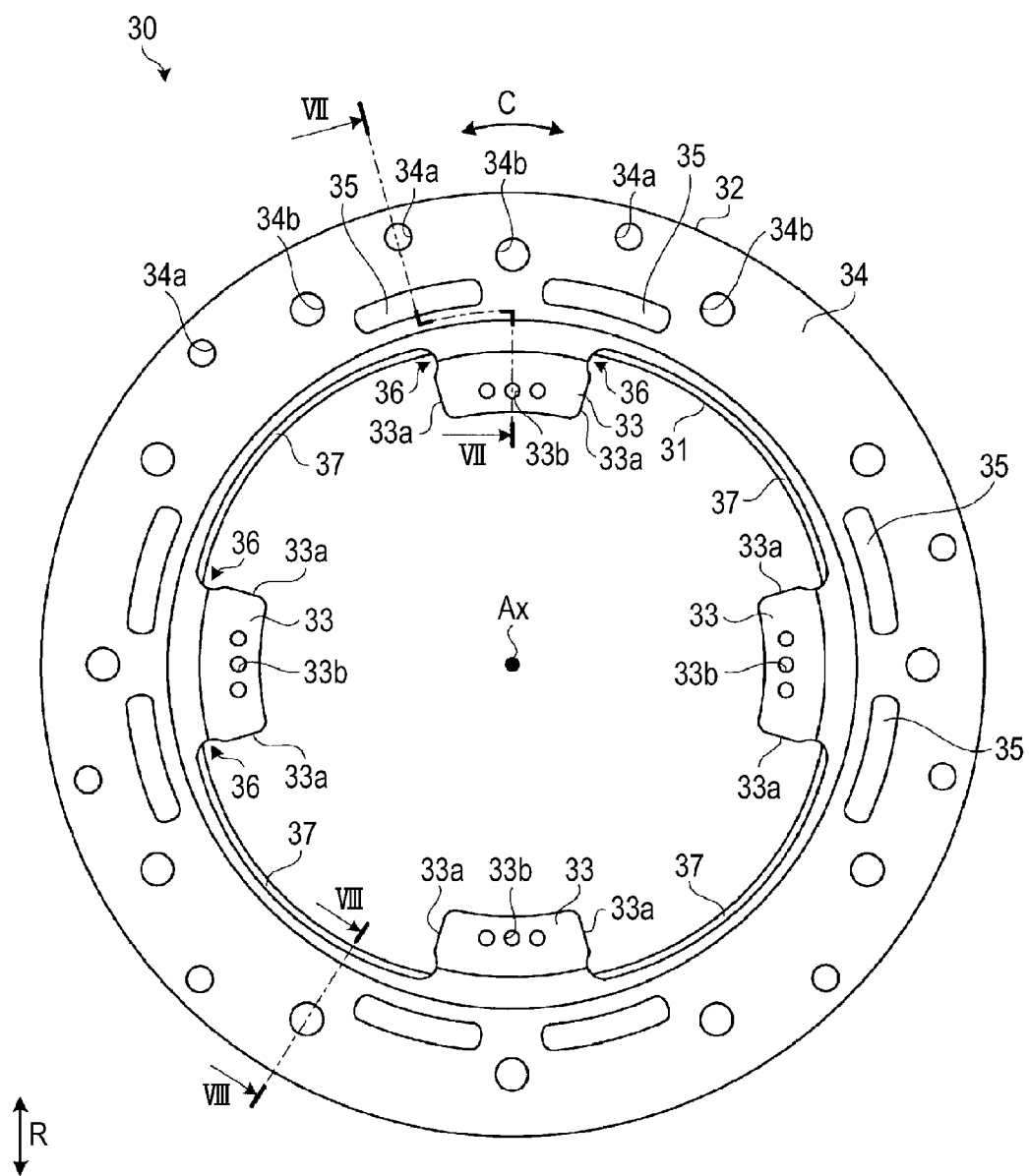
FIG. 6 illustrates an example of an overall configuration of the third plate of the damper device according to the embodiment.

As illustrated in FIGS. 2 and 6 to 10, the third plate 30 has an annular shape including the inner peripheral portion 31 and the outer peripheral portion 32 when viewed from the axial direction. The third plate 30 includes the first portion 33 arranged on the inner side (refer to FIGS. 2 and 3) of the opening 26 of the second plate 20, and a second portion 34 arranged on the outer side (refer to FIG. 2) of the opening 26 of the second plate 20. As illustrated in FIG. 6, the first portion 33 is provided to protrude from the second portion 34 in the radial direction. In addition, the first portion 33 is provided to have a predetermined width in the circumferential direction and to extend in the radial direction. In addition, four first portions 33 are provided to correspond to four openings 26 arranged in the second plate 20. Four first portions 33 are provided at intervals (at approximately equal intervals) in the circumferential direction along the inner peripheral portion 31 of the third plate 30.

Figure 9:
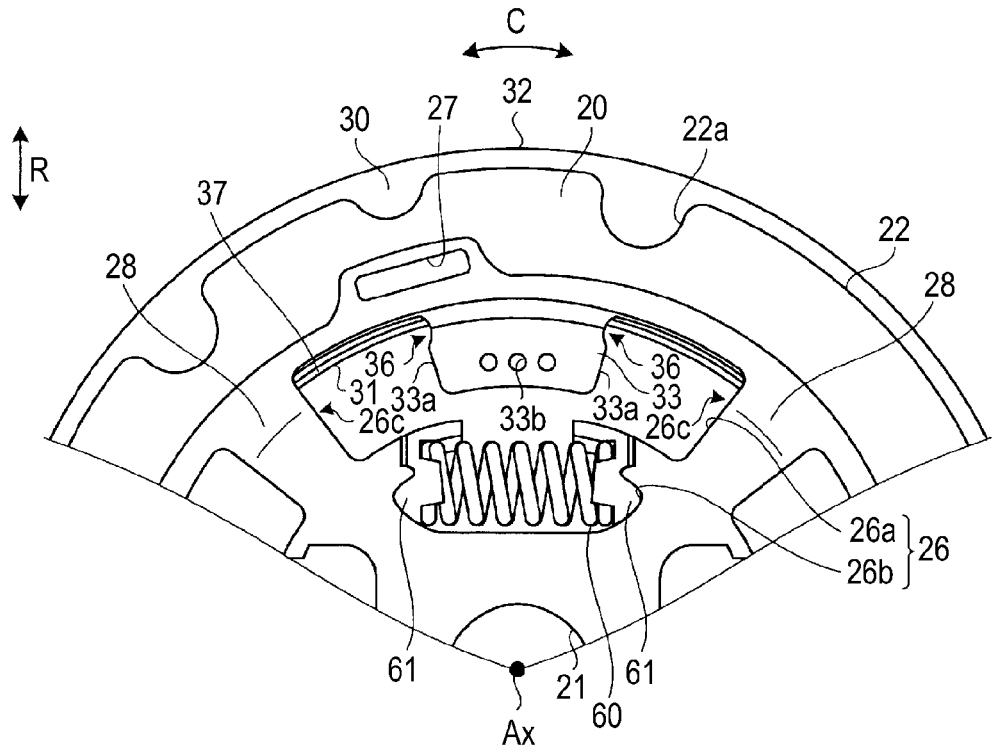
FIG. 9 is a schematic diagram illustrating an example in a state where the first portion (stopper) of the third plate of the damper device according to the embodiment and an inner side end surface of the opening of the second plate are separated from each other.
Figure 10:
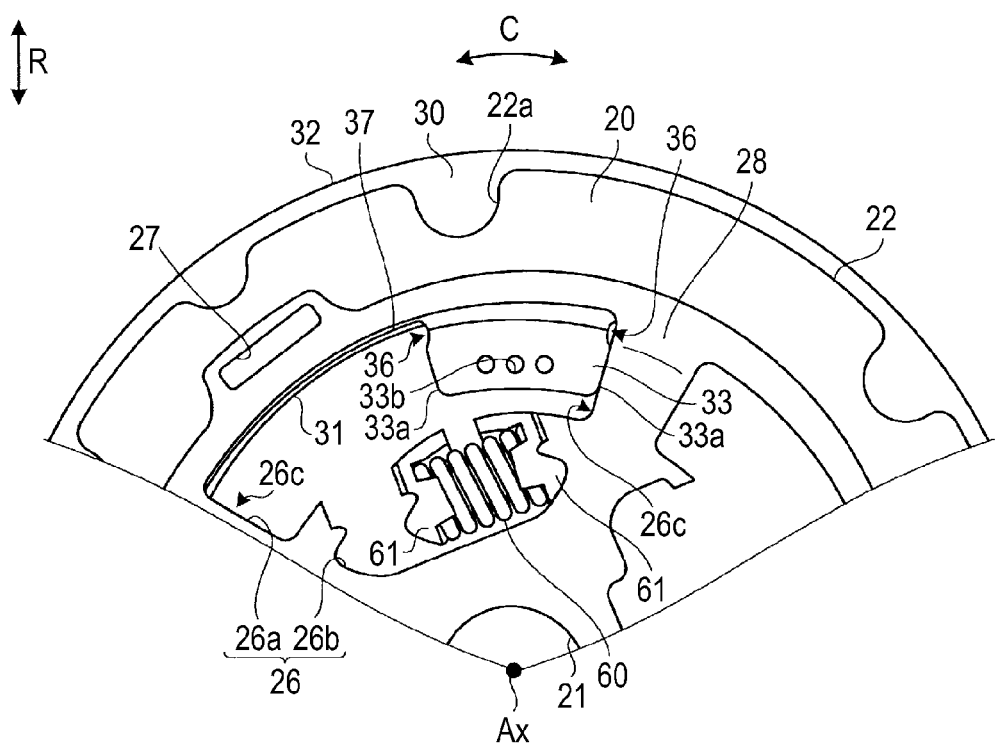
FIG. 10 is a schematic diagram illustrating an example in a state where the first portion (stopper) of the third plate of the damper device according to the embodiment and the inner side end surface of the opening of the second plate are in contact with each other.

In addition, the first portion 33 is configured to be capable of coming into contact with the inner side end surface of the opening 26 of the second plate 20. Specifically, as illustrated in FIGS. 3, 9 and 10, the inner side end surface in the circumferential direction of the opening 26 (first opening 26a) of the second plate 20 includes an opposing region 26c opposing an end portion 33a in the circumferential direction of the first portion 33, and the opposing region 26c and both end portions 33a in the circumferential direction of the first portion 33 are configured to be capable of coming into contact with each other. More specifically, the first portion 33 and the inner side end surface (opposing region 26c) in the circumferential direction of the opening 26 are configured to come into contact with each other when the first plate 10 and the third plate 30, and the second plate 20 relatively rotated around the rotation axis Ax. In this manner, the damper device 100 according to the embodiment disclosed here is configured so that a range of relative rotations around the rotation axis Ax is limited between the first plate 10 and the third plate 30, and the second plate 20 when the first portion 33 and the inner side end surface (opposing region 26c) of the opening 26 come into contact with each other. As a result, in the embodiment disclosed here, the first portion 33 is configured to function as a stopper which limits the range of the relative rotations around the rotation axis Ax between the first plate 10 and the third plate 30, and the second plate 20.

That is, in the embodiment disclosed here, as illustrated in FIG. 9, the first portion 33 (end portion 33a in the circumferential direction) is arranged at a position separated from the inner side end surface (opposing region 26c) of the opening 26 (first opening 26a) in an initial state where the elastic member 60 is not contracted (state where no torque difference occurs between the first plate 10 and the third plate 30, and the second plate 20). In addition, in the embodiment disclosed here, as illustrated in FIG. 10, the first portion 33 (end portion 33a in the circumferential direction) is arranged to come into contact with the inner side end surface (opposing region 26c) of the opening 26 (first opening 26a) in a state where the elastic member 60 is contracted to the maximum (state where a large torque difference occurs between the first plate 10 and the third plate 30, and the second plate 20). In FIGS. 9 and 10, only the second plate 20, the third plate 30, the elastic member 60 and the support member 61 are schematically illustrated for simple understanding, and the other members are omitted in the illustration. In addition, in FIGS. 9 and 10, the through-hole 20a of the second plate 20 and a screw insertion hole 34a of the third plate 30 are also omitted in the illustration.

Here, in the embodiment disclosed here, as illustrated in FIG. 3, an axial thickness t1 of the first portion 33 is thinner than an axial thickness t2 of a portion having the opening 26 of the second plate 20 (portion having the opposing region 26c opposing the first portion 33, on the inner side). In this manner, it is possible to arrange the first portion 33 without being caused to protrude in the axial direction from the portion having the opening 26 of the second plate 20. In the embodiment disclosed here, portions having the first portion 33 and the opening 26 of the second plate 20 are arranged so that central portions in the axial direction substantially coincide with each other. That is, in the embodiment disclosed here, the first portion 33 is provided to be positioned in a substantially center between an end portion E1 of one side (right side in FIG. 3) and an end portion E2 of the other side (left side in FIG. 3) in the axial direction of the inner side end surface (opposing region 26c) of the opening 26.

As illustrated in FIGS. 2 and 3, in a state where the first portion 33 is interposed between the pair of first plates 10 from both sides in the axial direction, the first portion 33 is coupled to the pair of first plates 10 by a fastener C3 (in FIGS. 2 and 3, as an example, a rivet). That is, through-holes 33b and 10a into which the faster C3 is inserted are respectively provided in portions where the first portion 33 and the first plate 10 oppose each other (surface contact portions). In addition, as illustrated in FIG. 2, the second portion 34 is attached to an outer portion (flywheel FW attached to an output side shaft S2 of an engine (not illustrated)) by a fastener C4 (in FIG. 2, as an example, a screw member). That is, the screw hole 34a and a screw hole into which the fastener C4 is inserted are respectively provided in portions where the second portion 34 and the flywheel FW oppose each other. Cutout portions 22a and 42a for exposing the fastener C4 (screw insertion hole 34a) to one side (right side in FIG. 2) are provided in portions where the outer peripheral portion 22 of the second plate 20 and the outer peripheral portion 42 of the fourth plate 40 respectively correspond to the fastener C4.

Figure 7:
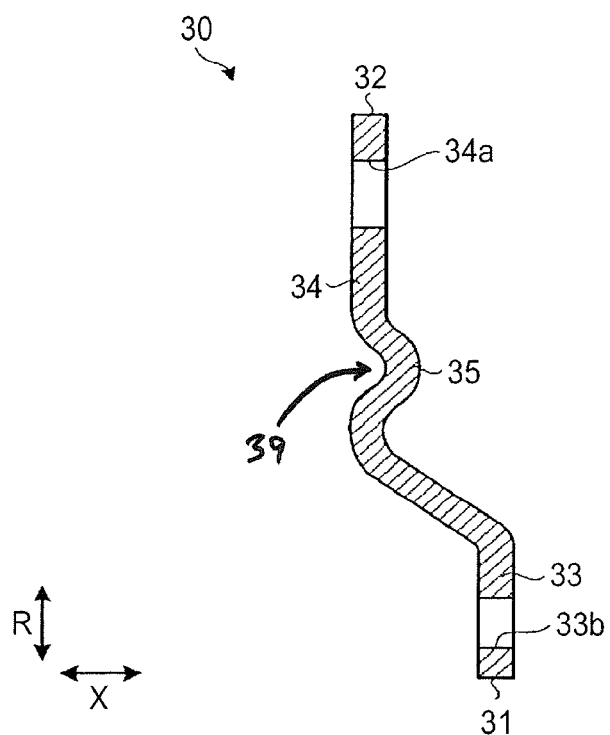
FIG. 7 is a cross-sectional view taken along line VII-VII in FIG. 5.

In addition, as illustrated in FIGS. 2 and 7, a first rib 35 protruding to one side (right side in FIGS. 2 and 7) in the axial direction is formed in a further outer side portion of the second portion 34 in the radial direction than the first portion 33. The first rib 35 is an example of a "first reinforcing portion". Here, as illustrated in FIG. 6, the first rib 35 is provided one by one at positions corresponding to end portions in the circumferential direction of the first portion 33 (further outer sides in the radial direction than corner portions 36 configured between the end portion in the circumferential direction of the first portion 33 and the second portion 34), and total eight first ribs 35 are provided in the entire third plate 30. These first ribs 35 are respectively formed to extend along the circumferential direction so as to straddle the corner portions 36 configured between the end portion 33a in the circumferential direction of the first portion 33 and the second portion 34. In the embodiment disclosed here, as illustrated in FIG. 2, through-holes 34b used in positioning during assembly or inspecting before shipment are provided in portions corresponding to the fastener C1 of the second portion 34. As illustrated in FIG. 6, twelve through-holes 34b are provided at intervals (at approximately equal intervals) in the circumferential direction.

Figure 8:
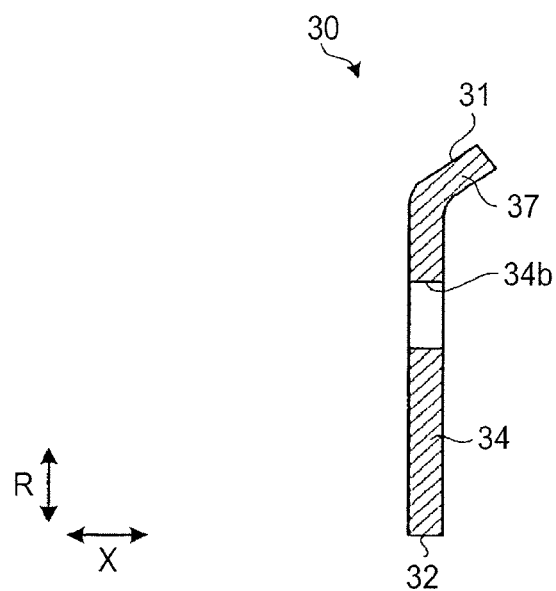
FIG. 8 is a cross-sectional view taken along line VIII-VIII in FIG. 5.

In addition, in the embodiment disclosed here, as illustrated in FIG. 6, a second rib 37 extending along the circumferential direction is formed in the inner side end portions in the radial direction of the second portion 34 (portions between two of four first portions 33 in the inner peripheral portion 31 of the third plate 30). The second rib 37 is an example of a "second reinforcing portion". As illustrated in FIGS. 2 and 8, the second rib 37 is formed so as to extend to be tilted to one side (right side in FIGS. 2 and 8) in the axial direction from the inner side end portion in the radial direction of the second portion 34. Specifically, the second rib 37 is configured in such a manner that the inner side end portion in the radial direction of the second portion 34 is cut and raised to one side in the axial direction.

In addition, in the embodiment disclosed here, as illustrated in FIGS. 2 and 5, a third rib 28 protruding the other side (left side in FIGS. 2 and 5) in the axial direction and having a stepped shape is formed near the portion of the second plate 20 which corresponds to the first portion 33 (portion having the opposing region 26c (refer to FIG. 3) circumferentially opposing the end portion 33a (refer to FIG. 6) in the circumferential direction of the first portion 33, on the inner side). The third rib 28 is an example of a "third reinforcing portion". As illustrated in FIG. 4, the third rib 28 is provided to extend along the circumferential direction, in each portion between edge portions of the outer peripheral portion 22 side of the respective first openings 26a of four openings 26 and four openings 26.

In the embodiment disclosed here, as illustrated in FIG. 2, out of the pair of first plates 10, the inner peripheral portion 21 of the first plate 10 arranged on the other side (left side in FIG. 2) in the axial direction is connected to the second portion 24 of the second plate 20 via a bearing (rolling bearing) 91. In this manner, the first plate 10 and the second plate 20 are configured to be mutually and relatively rotated around the rotation axis Ax. In addition, the pair of first plates 10 are coupled (co-fastened) to the first portion 33 of the third plate 30 by the fastener C3. In this manner, the first plate 10 and the third plate 30 are configured to be mutually and integrally rotated around the rotation axis Ax.

In addition, in the embodiment disclosed here, the second portion 24 of the second plate 20 is connected to the second portion 54 of the fifth plate 50 via a slide bearing 92 formed of a resin-made bush, and the third portion 25 of the second plate 20 is connected to the second portion 54 of the fifth plate 50 via the fourth plate 40 and the torque limiter 80 (connecting plate 85). In this manner, when slippage occurs in the torque limiter 80, the second plate 20 and the fourth plate 40 are mutually and relatively rotated around the rotation axis Ax. When the slippage does not occur in the torque limiter 80, the second plate 20 and the fourth plate 40 are mutually and integrally rotated around the rotation axis Ax.

As described above, in the embodiment disclosed here, as an example, the third plate 30 includes the first portion 33 provided on the inner side of the opening 26 of the second plate 20. In this manner, as an example, unlike the case where the third plate 30 is entirely provided on the outer side of the opening 26 (for example, a case where the third plate 30 and the second plate 20 are provided at positions separated from each other in the axial direction), it is possible to decrease the axial size of the damper device 100.

In addition, in the embodiment disclosed here, as an example, the first portion 33 (end portion 33a in the circumferential direction) and the inner side end surface (opposing region 26c) of the opening 26 (first opening 26a) are configured to be capable of coming contact with each other. The first portion 33 functions as the stopper for limiting the range of the relative rotations around the rotation axis Ax between the first plate 10 and the third plate 30, and the second plate 20. In this manner, as an example, unlike the case where the stopper is provided independently from the third plate 30 (when the stopper separated from the third plate 30 is provided between a pair of first plates 10), it is possible to reduce the number of parts, and it is possible to decrease the axial size of the portion where the stopper of the damper device 100 is provided.

In addition, in the embodiment disclosed here, as an example, the inner side end surface of the opening 26 (first opening 26a) includes the opposing region 26c opposing the first portion 33 in the circumferential direction. The first portion 33 is provided so as to be positioned between the end portion E1 of one side and the end portion E2 of the other side in the axial direction of the opposing region 26c. In this manner, as an example, unlike the case where the first portion 33 and the inner side end surface (opposing region 26c) of the opening 26 are provided to be partially overlapped with each other in a state of being axially displaced, it is possible to decrease the surface pressure applied to the portion where the first portion 33 and the opposing region 26c are in contact with each other.

That is, in the embodiment disclosed here, as an example, the thickness t1 in the axial direction of the first portion 33 of the third plate 30 is thinner than the thickness t2 in the axial direction of the portion having the opening 26 of the second plate 20 (portion having the opposing region 26c circumferentially opposing the end portion 33a in the circumferential direction of the first portion 33, on the inner side). The first portion 33 is arranged without being caused to protrude in the axial direction from the portion having the opening 26 of the second plate 20. In this manner, as an example, unlike the case where the first portion 33 protrudes in the axial direction from the portion having the opening 26 of the second plate 20, it is possible to decrease the axial size of the damper device 100.

In addition, in the embodiment disclosed here, as an example, the first plate 10 of the other side (left side in FIG. 2) in the axial direction out of the pair of first plates 10 and a portion of the second plate 20 (second portion 24) positioned between the pair of first plates 10 is configured to be mutually and relatively rotatable around the rotation axis Ax via the bearing 91. In this manner, as an example, the bearing 91 can prevent the first plate 10 and the second plate 20 from being rubbed together and worn out. Additionally, the first plate 10 and the second plate 20 can be rotated smoothly, mutually and relatively.

In addition, in the embodiment disclosed here, as an example, the first rib 35 is formed in the further outer side portion of the second plate 34 in the radial direction than the first portion 33. In this manner, as an example, it is possible to increase the rigidity of the third plate 30 by using the first rib 35. In addition, in the embodiment disclosed here, as an example, the first rib 35 is provided at the position corresponding to the corner portion 36 configured between the first portion 33 and the second portion 34. Therefore, the first rib 35 can prevent stress applied to the corner portion 36 configured between the first portion 33 and the second portion 34 from becoming high.

In addition, in the embodiment disclosed here, as an example, the second rib 36 is formed in the inner side end portion in the radial direction of the second portion 34. In this manner, as an example, it is possible to further increase the rigidity of the third plate 30 by using the second rib 36. That is, as an example, it is possible to prevent the inner side end portion in the radial direction of the second portion 34 from being deformed due to a load applied to the first portion 33 which is caused by the first portion 33 and the inner side end portion of the opening 26 coming into contact with each other.

In addition, in the embodiment disclosed here, as an example, the third rib 28 is formed near the portion of the second plate 20 which corresponds to the first portion 33 (portion having the opposing region 26c circumferentially opposing the end portion 33a in the circumferential direction of the first portion 33, on the inner side). In this manner, as an example, it is possible to increase the rigidity of the second plate 20 by using the third rib 28. That is, as an example, it is possible to prevent the second plate 20 from being deformed due to a load applied to the second plate 20 (portion having the opening 26) which is caused by the first portion 33 and the inner side end portion of the opening 26 coming into contact with each other.

In addition, in the embodiment disclosed here, as an example, the elastic member 60 and the torque limiter 80 are respectively provided on the inner side and the outer side in the radial direction with respect to the first portion 33 of the third plate 30. In this manner, as an example, it is possible to easily and respectively dispose the elastic member 60 and the torque limiter 80 by utilizing the inner side and outer side spaces in the radial direction of the first portion 33.

Hitherto, the embodiment disclosed here has been described as an example. However, the embodiment described above is merely an example, and is not intended to limit the scope of the invention. The embodiment described above can be implemented in various forms, and can be omitted, replaced, combined, and modified in various ways without departing from the spirit of the invention. In addition, the embodiment described above and the modification are included in the scope and the spirit of the invention, and are included in the invention disclosed in the appended claims and the equivalent scope. In addition, specifications of each configuring element in the embodiment described above (structure, type, direction, shape, size, length, width, thickness, height, number, arrangement, position, material and the like) can be appropriately changed to implement the embodiment.

For example, in the embodiment described above, a case has been described where the damper device is provided between the engine and the transmission, but the embodiment disclosed here is not limited thereto. The damper device according to the embodiment disclosed here can be provided between two rotating elements in addition to the above description (for example, between the engine and a rotating electric machine (motor generator)). In addition, the damper device according to embodiment disclosed here can be provided in various vehicles (for example, hybrid vehicles) or general machinery having the rotating element.

A damper device 100 according to an embodiment of this disclosure, as an example, includes a pair of first plates 10 that are provided at positions separated from each other in an axial direction of a rotation axis Ax and that are configured to be rotatable integrally with each other around the rotation axis Ax in a state where the pair of first plates 10 intersect the rotation axis Ax; a second plate 20 that includes a portion positioned between the pair of first plates 10, that has an opening 26, and that is configured to be rotatable around the rotation axis Ax in a state where the second plate 20 intersects the rotation axis Ax; an elastic member 60 that is provided between the first plate 10 and the second plate 20, and that is elastically deformed at least in a circumferential direction of the rotation axis Ax; and a third plate 30 that has a first portion 33 which is positioned on an inner side of the opening 26 of the second plate 20 and which is coupled to the pair of first plates 10 in a state where the first portion 33 is interposed between the pair of first plates 10 from both sides in the axial direction, and a second portion 34 which is positioned on an outer side of the opening 26 of the second plate 20, and that is configured to be rotatable around the rotation axis Ax in a state where the third plate 30 intersects the rotation axis Ax. The first portion 33 and an inner side end surface of the opening 26 are configured to be capable of coming into contact with each other, and when the first portion 33 and the inner side end surface of the opening 26 come into contact with each other, the first plate 10 the third plate 30, and the second plate 20 are configured so that a range of relative rotations around the rotation axis Ax is limited. In this manner, as an example, it is possible to reduce an axial size of the damper device 100.

In the damper device 100 described above, as an example, the inner side end surface of the opening 26 may include an opposing region 26c which opposes the first portion 33 in the circumferential direction, and the first portion 33 may be provided to be positioned between one side end portion and the other side end portion in the axial direction of the opposing region 26c. In this manner, as an example, unlike a case where the first portion 33 and the inner side end surface of the opening 26 (opposing region 26c) are provided to be partially overlapped with each other in a state of being axially displaced, it is possible to decrease a surface pressure applied to a portion where the first portion 33 and the opposing region 26c are in contact with each other.

In the damper device 100 described above, as an example, at least one of the pair of first plates 10 and a portion of the second plate 20 positioned between the pair of first plates 10 may be configured to be mutually and relatively rotatable around the rotation axis Ax via a bearing 91. In this manner, as an example, the bearing 91 can prevent the first plate 10 and the second plate 20 from being rubbed together and worn out.

In the damper device 100 described above, as an example, the second portion 34 may be formed in an annular shape. The first portion 33 may be provided to protrude inward from the second portion 34 in a radial direction of the rotation axis Ax, and a first reinforcing portion 35 may be provided in a further outer side portion of the second portion 34 in the radial direction than the first portion 33. In this manner, as an example, the first reinforcing portion 35 can increase rigidity of the third plate 30.

In the damper device 100 described above, as an example, the second portion 34 may be formed in an annular shape. The first portion 33 is provided to protrude inward from the second portion 34 in a radial direction of the rotation axis Ax, and a second reinforcing portion may be provided in an inner end side portion of the second portion 34 in the radial direction. In this manner, as an example, the second reinforcing portion can further increase the rigidity of the third plate 30.

In the damper device 100 described above, as an example, a third reinforcing portion is provided near a portion of the second plate 20 which corresponds to the first portion 33. In this manner, as an example, the third reinforcing portion can increase the rigidity of the second plate 20.

The damper device 100 described above, as an example, may further include a torque limiter that is provided in the second plate 20. The elastic member 60 and the torque limiter may be respectively provided on an inner side and an outer side in the radial direction with respect to the first portion 33 of the third plate 30. In this manner, as an example, it is possible to dispose the elastic member 60 and the torque limiter by utilizing a space of the inner side and the outer side in the radial direction of the first portion 33.

In the damper device 100 described above, as an example, the inner side end surface of the opening 26 may include an opposing region 26c which opposes the first portion 33 in the circumferential direction, and the first portion 33 may be provided to be positioned substantially in the center between one side end portion and the other side end portion in the axial direction of the opposing region 26c. In this manner, as an example, unlike the case where the first portion 33 and the inner side end surface of the opening 26 (opposing region 26c) are provided to be partially overlapped with each other in a state of being axially displaced, it is possible to decrease the surface pressure applied to the portion where the first portion 33 and the opposing region 26c are in contact with each other.

In the damper device 100 described above, as an example, four openings 26 may be provided in the second plate 20 and the first portion 33 may be provided corresponding to the opening 26. In this manner, the first portion 33 can be function as a stopper which limits the range of the relative rotations around the rotation axis Ax between the first plate 10 and the third plate 30, and the second plate 20.

In the damper device 100 described above, as an example, the first reinforcing portion 35 may extend along the circumferential direction so as to straddle a gap 39 (shown in FIG. 7) formed between an end portion 33a in the circumferential direction of the first portion 33 and the second portion 34. In this manner, it is possible to increase the rigidity of the third plate 30 by using the first reinforcing portion 35.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A damper device comprising:
a pair of first plates that are provided at positions separated from each other in an axial direction of a rotation axis and that are configured to be rotatable integrally with each other around the rotation axis in a state where the pair of first plates intersect the rotation axis;
a second plate that includes a portion positioned between the pair of first plates, that has an opening, and that is configured to be rotatable around the rotation axis in a state where the second plate intersects the rotation axis;
an elastic member that is provided between the first plate and the second plate, and that is elastically deformed at least in a circumferential direction of the rotation axis;
a third plate that has a first portion which is positioned on an inner side of the opening of the second plate and which is coupled to the pair of first plates in a state where the first portion is interposed between the pair of first plates from both sides in the axial direction, and a second portion which is positioned on an outer side of the opening of the second plate, and that is configured to be rotatable around the rotation axis in a state where the third plate intersects the rotation axis;
a torque limiter that is provided in the second plate;
wherein the first portion and an inner side end surface of the opening are configured to be capable of coming into contact with each other;
wherein when the first portion and the end surface come into contact with each other, the first plate and the third plate, and the second plate are configured so that a range of relative rotations around the rotation axis is limited; and
wherein the elastic member and the torque limiter are respectively provided on an inner side and an outer side in the radial direction of the rotation axis with respect to the first portion of the third plate.

2. The damper device according to claim 1,
wherein the end surface includes an opposing region which opposes the first portion in the circumferential direction, and
wherein the first portion is provided to be positioned between one side end portion and the other side end portion in the axial direction of the opposing region.

3. The damper device according to claim 1,
wherein at least one of the pair of first plates and a portion of the second plate positioned between the pair of first plates are configured to be mutually and relatively rotatable around the rotation axis via a bearing.

4. The damper device according to claim 1,
wherein the second portion is formed in an annular shape,
wherein the first portion is provided to protrude inward from the second portion in a radial direction of the rotation axis, and
wherein a first reinforcing portion is provided in a further outer side portion of the second portion in the radial direction than the first portion.

5. The damper device according to claim 4,
wherein the first reinforcing portion extends along the circumferential direction so as to straddle a gap formed between an end portion in the circumferential direction of the first portion and the second portion.

6. The damper device according to claim 1,
wherein the second portion is formed in an annular shape,
wherein the first portion is provided to protrude inward from the second portion in a radial direction of the rotation axis, and
wherein a second reinforcing portion is provided in an inner side end portion of the second portion in the radial direction.

7. The damper device according to claim 1,
wherein the end surface includes an opposing region which opposes the first portion in the circumferential direction, and
wherein the first portion is provided to be positioned in a substantially center between one side end portion and the other side end portion in the axial direction of the opposing region.

8. The damper device according to claim 1,
wherein four openings are provided in the second plate and the first portion is provided corresponding to the opening.

9. A damper device comprising:
a pair of first plates that are provided at positions separated from each other in an axial direction of a rotation axis and that are configured to be rotatable integrally with each other around the rotation axis in a state where the pair of first plates intersect the rotation axis;
a second plate that includes a portion positioned between the pair of first plates, that has an opening, and that is configured to be rotatable around the rotation axis in a state where the second plate intersects the rotation axis;
an elastic member that is provided between the first plate and the second plate, and that is elastically deformed at least in a circumferential direction of the rotation axis;
a third plate that has a first portion which is positioned on an inner side of the opening of the second plate and which is coupled to the pair of first plates in a state where the first portion is interposed between the pair of first plates from both sides in the axial direction, and a second portion which is positioned on an outer side of the opening of the second plate, and that is configured to be rotatable around the rotation axis in a state where the third plate intersects the rotation axis;
wherein the first portion and an inner side end surface of the opening are configured to be capable of coming into contact with each other;
wherein when the first portion and the end surface come into contact with each other, the first plate and the third plate, and the second plate are configured so that a range of relative rotations around the rotation axis is limited; and
wherein a third reinforcing portion is provided in a portion of the second plate which corresponds to the first portion.

* * * * *